US011650783B2

United States Patent
Asai et al.

(10) Patent No.: US 11,650,783 B2
(45) Date of Patent: May 16, 2023

(54) INFORMATION TRANSMISSION SYSTEM

(71) Applicant: SUBARU CORPORATION, Tokyo (JP)

(72) Inventors: Takayuki Asai, Tokyo (JP); Hiroyuki Tsubata, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 69 days.

(21) Appl. No.: 17/220,326

(22) Filed: Apr. 1, 2021

(65) Prior Publication Data

US 2021/0312152 A1    Oct. 7, 2021

(30) Foreign Application Priority Data

Apr. 3, 2020    (JP) .............................. JP2020-067172

(51) Int. Cl.
| | | |
|---|---|---|
| *G06K 7/14* | (2006.01) | |
| *G06F 3/14* | (2006.01) | |
| *B64D 45/00* | (2006.01) | |
| *G06V 10/22* | (2022.01) | |

(52) U.S. Cl.
CPC ............ *G06K 7/1447* (2013.01); *B64D 45/00* (2013.01); *G06F 3/14* (2013.01); *G06K 7/1417* (2013.01); *G06V 10/225* (2022.01)

(58) Field of Classification Search
CPC ............................ G06K 7/1447; G06V 10/225
USPC ........................................................ 235/462.1
See application file for complete search history.

(56) References Cited

U.S. PATENT DOCUMENTS

| | | | | |
|---|---|---|---|---|
| 11,400,887 | B2* | 8/2022 | Luchner | B60R 25/01 |
| 2006/0284759 | A1* | 12/2006 | Wahl | G01S 13/78 |
| | | | | 342/45 |
| 2015/0082410 | A1* | 3/2015 | Fitzgerald | H04L 63/0853 |
| | | | | 726/9 |
| 2016/0124428 | A1* | 5/2016 | Nutaro | B64D 41/00 |
| | | | | 701/2 |
| 2016/0275329 | A1* | 9/2016 | Gussen | G06K 19/06037 |
| 2017/0011634 | A1* | 1/2017 | Ringlen | G08G 5/0026 |
| 2019/0149322 | A1* | 5/2019 | Bar-Nahum | H04L 9/3213 |
| | | | | 380/278 |
| 2020/0166632 | A1* | 5/2020 | Schwindt | G08G 5/0008 |
| 2021/0197966 | A1* | 7/2021 | Zhang | G08G 5/0008 |
| 2022/0150689 | A1* | 5/2022 | Newman | G06K 7/1095 |

FOREIGN PATENT DOCUMENTS

JP    2016-203674 A    12/2016

* cited by examiner

*Primary Examiner* — Allyson N Trail
(74) *Attorney, Agent, or Firm* — McDermott Will & Emery LLP

(57) ABSTRACT

An information transmission system includes an encoder, a display, an imaging apparatus, and a decoder. The encoder is mounted on a first aircraft and is configured to encode information to create a secret code. The display is mounted on the first aircraft and is configured to display the secret code created by the encoder at a predetermined position on a surface of a body of the first aircraft. The imaging apparatus is mounted on a second aircraft and is configured to capture an image of the first aircraft. The decoder is mounted on the second aircraft and is configured to detect an image region including the secret code from the image captured by the imaging apparatus, decode the secret code by performing image processing on the detected image region, and read the information.

3 Claims, 4 Drawing Sheets

INFORMATION TRANSMISSION SYSTEM

CROSS-REFERENCE TO RELATED APPLICATIONS

The present application claims priority from Japanese Patent Application No. 2020-067172 filed on Apr. 3, 2020, the entire contents of each of which are hereby incorporated by reference.

BACKGROUND

The technology relates to an information transmission system.

When highly confidential information is transmitted via wireless communication between aircrafts flying in a combat zone, for example, a transmitter encodes the information into a secret code that requires a password when decoded, and a receiver decodes the information using the password, in some cases. In such a case, a one-time password valid for only one decoding process or a periodically changing password is used to enhance the confidentiality of the information. Reference is made to Japanese Unexamined Patent Application Publication No. 2016-203674.

SUMMARY

An aspect of the technology provides an information transmission system including an encoder, a display, an imaging apparatus, and a decoder. The encoder is mounted on a first aircraft and is configured to encode information to create a secret code. The display is mounted on the first aircraft and is configured to display the secret code created by the encoder at a predetermined position on a surface of a body of the first aircraft. The imaging apparatus is mounted on a second aircraft and is configured to capture an image of the first aircraft. The decoder is mounted on the second aircraft and is configured to detect an image region including the secret code from the image captured by the imaging apparatus, decode the secret code by performing image processing on the detected image region, and read the information.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

A password or confidential information transmitted to an accompanying aircraft via wireless communication can be easily stolen and decoded by a third party such as an enemy.

Therefore, it is desired to provide an information transmission system that makes it possible to transmit a password between accompanying aircrafts while keeping the password confidential.

The information transmission system that transmits highly confidential information between accompanying aircrafts may be used not only to transmit a password necessary to encode or decode confidential information as described above, but also to transmit encoded information itself. Thus, it is also desired to provide an information transmission system that makes it possible to transmit encoded information itself between accompanying aircrafts while keeling the encoded information confidential.

It is desirable to provide an information transmission system that makes it possible to transmit encoded information between aircrafts while keeping the encoded information confidential.

An information transmission system according to some example embodiments of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. In the following example embodiments, aircrafts may be helicopters. However, the aircrafts may be combat aircrafts, for example.

Figure 1:
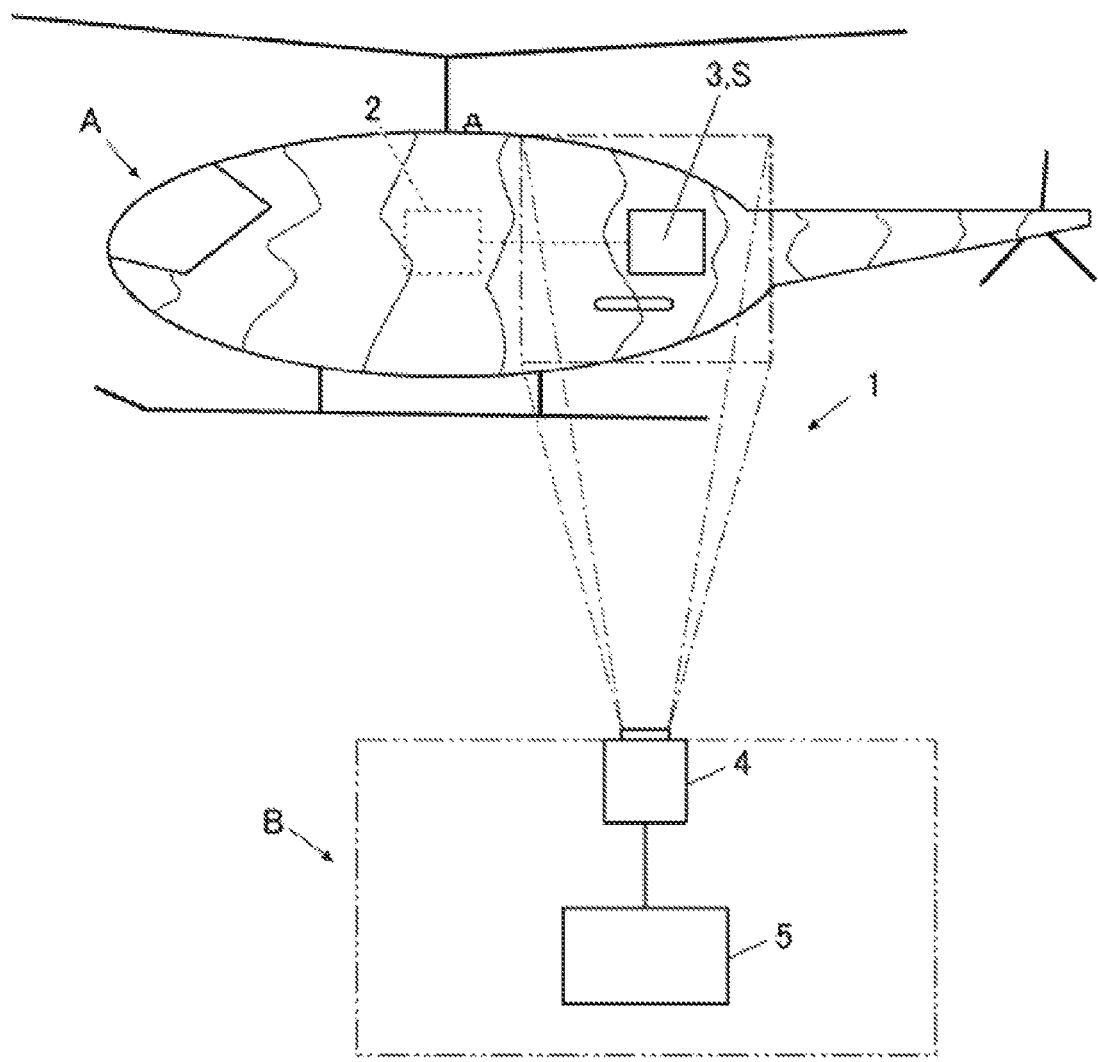
FIG. 1 is a diagram illustrating an information transmission system according to one example embodiment of the technology.

FIG. 1 illustrates an exemplary configuration of an information transmission system 1 according to an example embodiment of the technology.

The information transmission system 1 may transmit information between accompanying aircrafts. The information transmission system 1 includes an encoder 2 and a display 3 mounted on one of the accompanying aircrafts (hereinafter referred to as a first aircraft A), and an imaging apparatus 4 and a decoder 5 mounted on the other accompanying aircraft (hereinafter referred to as a second aircraft B).

The encoder 2 may be a versatile computer or a dedicated device. The encoder 2 may encode information to be transmitted from the first aircraft A to the second aircraft B into a secret code.

An example way to encode the information using the encoder 2 will be described later.

The display 3, which is mounted on the first aircraft A together with the encoder 2, may be a cathode ray tube (CRT) or a liquid crystal display (LCD), for example. The display 3 may display a secret code created by the encoder 2 from the information at a predetermined position S on the body surface of the first aircraft A.

In FIG. 1, the position of the display 3 (i.e., the predetermined position S at which the secret code is displayed) is surrounded by a rectangular frame for ease of explanation. However, when the body of the first aircraft A is actually viewed from a position some distance from the first aircraft A, the predetermined position S is not identified because the screen of the display 3 is indistinguishable from the body surface of the first aircraft A.

To achieve such a configuration, the screen of the display 3 may be made almost indistinguishable from the body surface of the first aircraft A in various ways. For example, the screen of the display 3 may be embedded in the body surface of the first aircraft A so as to be leveled with the body surface of the first aircraft A. Alternatively, for an aircraft having a slightly curved body surface, the screen of the display 3 may be slightly curved conforming to the curbed body surface.

In this example embodiment, the screen of the display 3 may be embedded in the body surface of the first aircraft A. However, in another example embodiment, the display 3 may a projector that projects the secret code at the predetermined position S on the body surface of the first aircraft A.

In still another example embodiment, the display 3 may be a reflective liquid crystal display that emits no light or no electromagnetic wave.

Using such a display emitting no light or no electromagnetic wave allows the secret code to be displayed at the predetermined position S only by extraneous light, which achieves passive communication. Therefore, it is possible to achieve highly confidential information transmission.

The imaging apparatus 4, which is mounted on the second aircraft B, captures an image of a portion of the body surface of the first aircraft A including the predetermined position S (i.e., the position on the body surface of the first aircraft A at which the secret code is displayed).

In the present example embodiment, the imaging apparatus 4 may capture a static image. Alternatively, the imaging apparatus 4 may capture a moving image. Still alternatively, the imaging apparatus 4 may capture a color image. Different color components in the color image captured by the imaging apparatus 4 may carry different data items. Therefore, an increased amount of information may be carried by the color image, compared with a monochrome image.

The decoder 5, which is mounted on the second aircraft B together with the imaging apparatus 4, may include a versatile computer or a dedicated device.

The decoder 5 detects an image region including the secret code from the image captured by the imaging apparatus 4, decodes the secret code by performing image processing on the detected image region, and reads the information.

As described above, the screen of the display 3 may be made almost indistinguishable from the body surface of the first aircraft A in the present example embodiment. Thus, it is necessary for the decoder 5 to detect the image region including the secret code from the image captured by the imaging apparatus 4.

In the present example embodiment, the decoder 5 may detect the image region including the secret code from the image captured by the imaging apparatus 4 on the basis of detection markers. The detection markers may be the body outline of the first aircraft A and the outline of the object fixed to the body of the first aircraft A that are captured in the captured image.

Figure 2A:
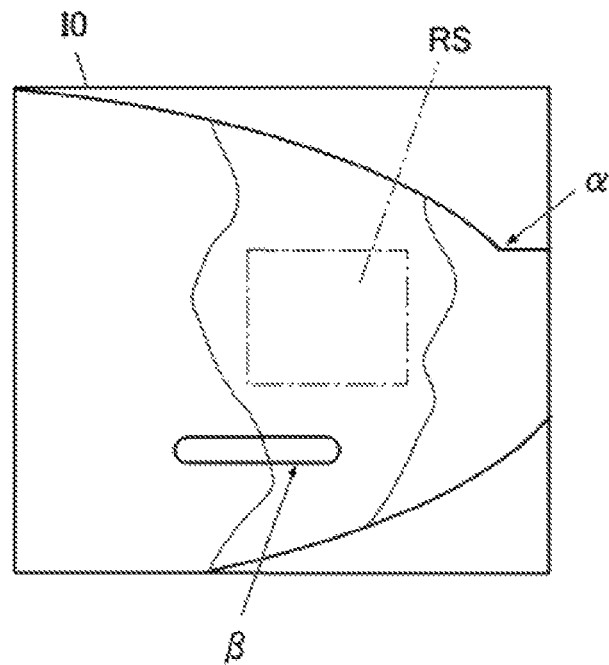
FIG. 2A is an exemplary image captured by an imaging apparatus of the information transmission system illustrated in FIG. 1.

For example, as illustrated in FIG. 2A, the imaging apparatus 4 may capture an image I0 of the body surface of the first aircraft A including the predetermined position S illustrated in FIG. 1. In such a case, the decoder 5 may correct the position, magnification, and other parameters of the image I0 so that the detection markers, such as the distinctive body outline α of the first aircraft A and the outline β of the object fixed to the body of the first aircraft A, are located at predetermined positions in the image I0. A corrected image I1 illustrated in FIG. 2B may be thereby obtained.

The decoder 5 may preliminarily store information on the positional relation of the detection markers α and β of the actual body of the first aircraft A relative to the predetermined position S at which the secret code is displayed.

Figure 2B:
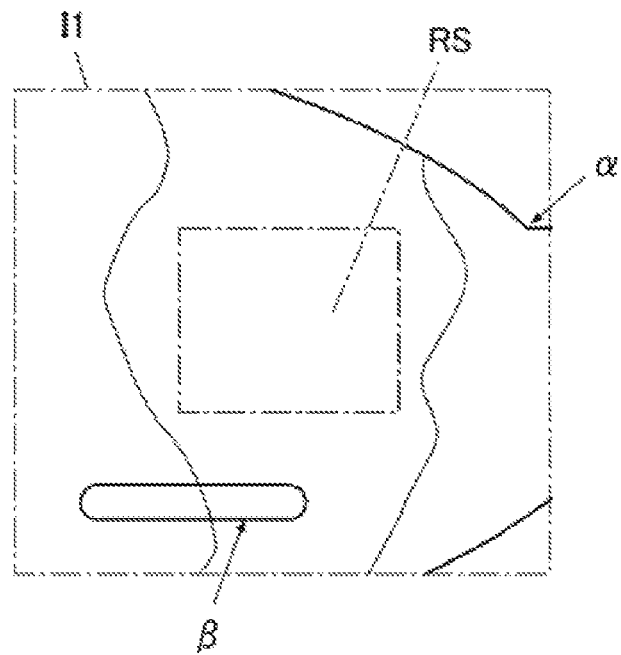
FIG. 2B is an exemplary corrected image obtained by correcting the position, magnification, and other parameters of the image illustrated in FIG. 2A.

As illustrated in FIG. 2B, the decoder 5 of the present example embodiment may detect, from the corrected image I1, the image region corresponding to the predetermined position S at which the secret code is displayed (hereinafter referred to as an image region RS) on the basis of the positions or pixels of the detection markers α and β in the corrected image I1.

Alternatively, the image region RS including the secret code may be detected directly from the image I0 captured by the imaging apparatus 4 without creating the corrected image I1, as illustrated in FIG. 2A.

The decoder 5 decodes the secret code by performing image processing on the detected image region RS, and reads the information. The description on how to decode the secret code using the decoder 5 is omitted herein because the process of decoding the secret code executed by the decoder 5 may be performed in an opposite manner to the encoding process executed by the encoder 2.

Described next is an exemplary way to encode information using the encoder 2.

In the present example embodiment, the encoder 2 may convert received information into a two-dimensional code. The two-dimensional code may have a contrast pattern including bright cells and dark cells arranged in a grid form.

In the present example embodiment, the decoder 5 may detect the image region RS including the secret code displayed on the body surface of the first aircraft A on the basis of the positions of the detection markers α and β in the image, as described above. Thus, there is no need for the encoder 2 to embed a position detection pattern (e.g., three distinctive symbols in a QR code (registered trademark)) into the contrast pattern of the secret code.

A position detection pattern displayed at the predetermined position S (refer to FIG. 1) on the body surface of the first aircraft A at which the secret code is displayed can reveal the presence of the secret code at the predetermined position S to the third party such as an enemy. Therefore, in the present example embodiment, no predetermined pattern, such as a position detection pattern or a symbol, may be displayed in the grid region of the secret code.

As illustrated in FIG. 1, for example, the first aircraft A may have a body surface painted into a camouflage pattern, in the present example embodiment.

To prevent the presence of the secret code displayed at the predetermined position S on the body surface of the first aircraft A from being identified by the third party, the display 3 may display the secret code in such a manner that the secret code is identified as a part of the pattern on the body surface of the first aircraft A when viewed from a long distance of 500 meters or longer, for example.

For example, the contrast pattern of the secret code may be adjusted in color such that an average color value of the contrast pattern is equal to an average color value of the pattern (e.g., camouflage pattern) on the body surface of the first aircraft A. The secret code may be thereby buried in the pattern of the body surface of the first aircraft A (i.e., the secret code may be integrated with the pattern of the body surface of the first aircraft A) when viewed at a low resolution (e.g., when viewed from a long distance). This prevents the presence of the secret code displayed on the body surface of the first aircraft A from being identified.

Figure 3:
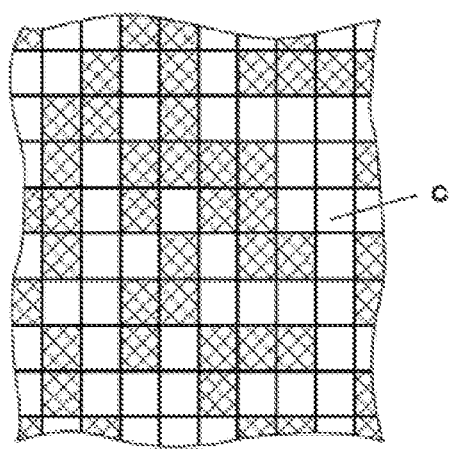
FIG. 3 is a view of an exemplary secret code having an contrast pattern.

In another example embodiment illustrated in FIG. 3, the secret code displayed on the body surface of the first aircraft may have a pattern including clear contrast boundaries between the bright color cells c and the dark color cells c.

In still another example embodiment which is not illustrated, the contrast boundaries may be shaded into gradation so as to be as less conspicuous as possible.

In the present example embodiment in which the first aircraft A has a body surface painted in a camouflage pattern as described above, the contrast pattern may be created using the colors of the camouflage pattern to make the contrast pattern of the secret code less conspicuous.

Note that, if the contrast pattern is made much less conspicuous by using colors other than the colors of the pattern on the body surface of the aircraft, the contrast pattern of the secret code may be created using the colors other than the colors of the pattern on the body surface of the aircraft.

According to the information transmission system 1 of the present example embodiment, the image of the secret code displayed on the body surface of one of the accompanying aircrafts (i.e., the first aircraft A) is captured by the other accompanying aircraft (i.e., the second aircraft B). The second aircraft B detects, from the captured image, the image region including the secret code, decodes the secret code by performing image processing on the detected image region, and reads the information.

As described above, the information transmission system 1 according to the present example embodiment transmits information (including a password to transmit the information) between accompanying aircrafts without using wireless communication. Thus, there is no possibility of the information being stolen by a third party such as an enemy. Accordingly, it is possible to transmit encoded information between accompanying aircrafts while keeping the encoded information confidential.

In the foregoing example embodiments, the decoder 5 may read only one piece of information from the secret code created by the encoder 2. However, the decoder 5 may read two or more pieces of information from the secret code created by the encoder 2.

An example way to create the secret code including two or more pieces of information will now be described in detail.

In the foregoing example embodiments, the secret code may be created in the form of a two-dimensional code having the contrast pattern including the cells c arranged in the grid form, as illustrated in FIG. 3, for example.

Figure 4A:
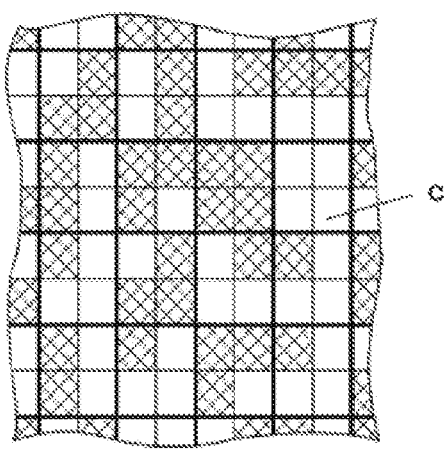
FIG. 4A is a view of an exemplary secret code having a contrast pattern sectioned for four cells.
Figure 4B:
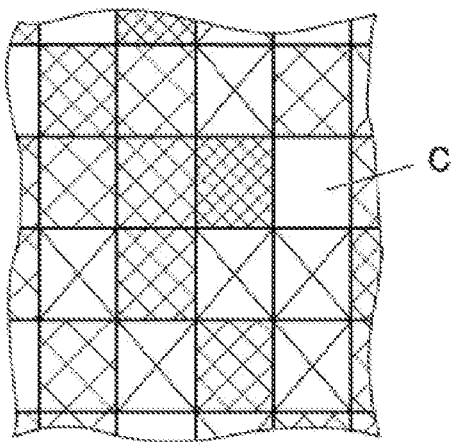
FIG. 4B is a view of an exemplary secret code having a gradation pattern including large cells each having an average value.

Optionally, a gradation pattern illustrated in FIG. 4B of the secret code may be obtained by calculating an average value among 2×2 cells—each having a value of, for example, 1 or 0—of the contrast pattern illustrated in FIG. 4A, and applying the average value to a large cell C having the 2×2 cells, for example. As a result, the gradation pattern illustrated in FIG. 4B may have the large cells C each having the average value.

The gradation pattern including the large cells C may be used as a different code from the code having the contrast pattern illustrated in FIG. 3. Note that the gradation pattern illustrated in FIG. 4B may be binarized into a contrast pattern when in use, for example.

In such a case, the encoder 2 may create a two-dimensional code having the contrast pattern (illustrated in FIG. 3) including the small cells c arranged in a grid form and the gradation pattern (or another contrast pattern illustrated in FIG. 4B) including the large cells C derived from the contrast pattern. The gradation pattern may carry different information from that carried by the contrast pattern illustrated in FIG. 3.

To decode the secret code having such a configuration, the decoder 5 may switch the cells to be decoded between the small cells c and the large cells C by switching the data rate. Several pieces of information (two pieces of information in this example) may be thereby read from the two-dimensional code (secret code).

Note that the large cell C does not necessarily correspond to the four small cells c, and that any appropriate data rate may be set. The information on the switchable data rates may be shared between the encoder 2 and the decoder 5.

Instead of switching the data rate by the decoder 5 as described above, the data rate may be switched by capturing images of the secret code displayed on the body surface of the first aircraft A by the second aircraft B several times while changing the distance between the first aircraft A and the second aircraft B, for example.

For instance, when the image of the body surface of the first aircraft A is captured by the second aircraft B relatively remote (e.g., 60 meters away) from the second aircraft B, the image of the secret code may be captured in the form of the two-dimensional code having the large cells C, as illustrated in FIG. 4B, for example. In contrast, when the image of the body surface of the first aircraft A is captured by the second aircraft B flying closer to (e.g., 30 meters away from) the first aircraft A, the image of the secret code may be captured in the form of the two-dimensional code having the small cells c, as illustrated in FIG. 3, for example. Note that this depends on the resolution of the imaging apparatus 4 (refer to FIG. 4), for example.

Accordingly, it is possible to read several pieces of information from a single secret code by capturing the images of the secret code several times while changing the distance between the first aircraft A and the second aircraft B.

Figure 5A:
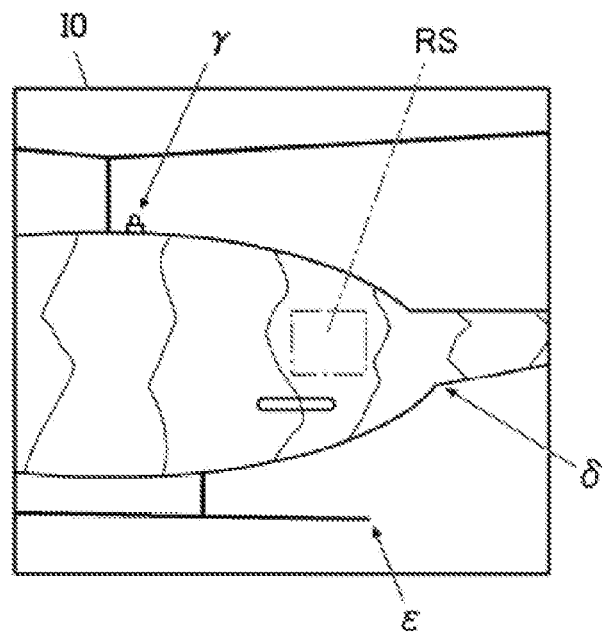
FIG. 5A is an exemplary image of a first aircraft captured by a second aircraft flying relatively remote from the first aircraft.
Figure 5B:
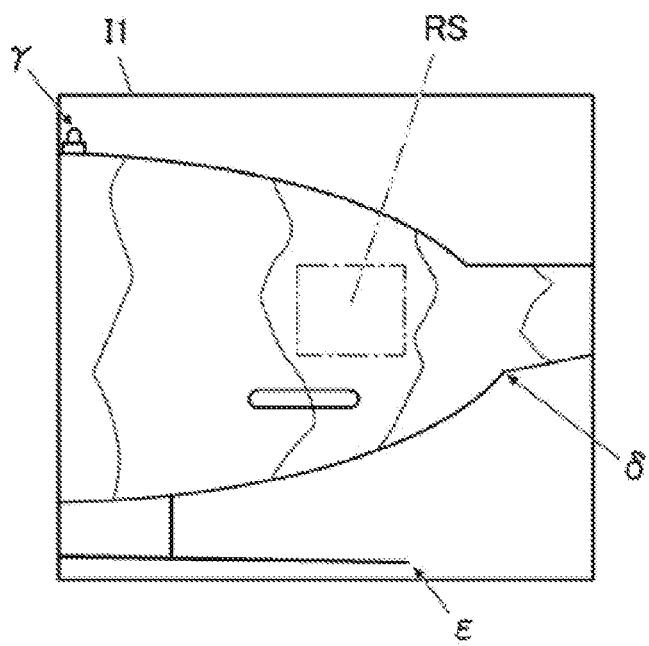
FIG. 5B is an exemplary corrected image obtained by correcting the image illustrated in FIG. 5A.

In this case, the image I0 (illustrated in FIG. 5A) captured by the second aircraft B flying relatively remote from the first aircraft A may be corrected into the corrected image I1 illustrated in FIG. 5B. During the correction, detection markers γ to ε illustrated in FIGS. 5A and 5B may be used that are different from the detection markers α and β illustrated in FIGS. 2A and 2B used for the correction of the image I0 captured by the second aircraft B flying closer to the first aircraft A. The detection markers γ and ε may be the outlines of the objects fixed to the aircraft body, and the detection marker δ may be the distinctive body outline of the aircraft.

Note that some of the detection markers γ to ε used to correct the image I0 captured by the second aircraft B flying relatively remote from the first aircraft A may be the same as the detection markers α and β used to correct the image I0 captured by the second aircraft B flying closer to the first aircraft A.

Alternatively, the image region RS (illustrated in FIG. 5A) including the secret code may be detected directly from the image I0 captured by the imaging apparatus 4 of the second aircraft B flying relatively remote from the first aircraft A (see FIGS. 5A and 5B) without creating the corrected image I1.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

The invention claimed is:

1. An information transmission system comprising:
an encoder mounted on a first aircraft and configured to encode information to create a secret code;
a display mounted on the first aircraft and configured to display the secret code created by the encoder at a predetermined position on a surface of a body of the first aircraft;
an imaging apparatus mounted on a second aircraft and configured to capture an image of the first aircraft; and
a decoder mounted on the second aircraft and configured to detect an image region including the secret code from the image captured by the imaging apparatus, decode the secret code by performing image processing on the detected image region, and read the information,
wherein the encoder is configured to create the secret code by converting the information into a two-dimensional code having a contrast pattern including cells arranged in a grid form.

2. An information transmission system comprising:
an encoder mounted on a first aircraft and configured to encode information to create a secret code;
a display mounted on the first aircraft and configured to display the secret code created by the encoder at a predetermined position on a surface of a body of the first aircraft;
an imaging apparatus mounted on a second aircraft and configured to capture an image of the first aircraft; and
a decoder mounted on the second aircraft and configured to detect an image region including the secret code from the image captured by the imaging apparatus, decode the secret code by performing image processing on the detected image region, and read the information,
wherein the surface of the body of the first aircraft is painted in a pattern, and
wherein the display is configured to display the secret code in such a manner that the secret code is identified as a part of the pattern when viewed from a long distance.

3. An information transmission system comprising:
an encoder mounted on a first aircraft and configured to encode information to create a secret code;
a display mounted on the first aircraft and configured to display the secret code created by the encoder at a predetermined position on a surface of a body of the first aircraft;
an imaging apparatus mounted on a second aircraft and configured to capture an image of the first aircraft; and
a decoder mounted on the second aircraft and configured to detect an image region including the secret code from the image captured by the imaging apparatus, decode the secret code by performing image processing on the detected image region, and read the information,
wherein the decoder is configured to detect the image region including the secret code from the image on a basis of a detection marker appearing in the image, the detection marker comprising one or both of an outline of the body of the first aircraft and an outline of an object fixed to the body of the first aircraft.

* * * * *